United States Patent [19]

Daimon et al.

[11] Patent Number: 4,987,039
[45] Date of Patent: Jan. 22, 1991

[54] MAGNETIC RECORDING MEDIUM

[75] Inventors: Hideo Daimon; Osamu Kitakami, both of Toride; Hideo Fujiwara, Ibaraki, all of Japan

[73] Assignee: Hitachi, Ltd., Tokyo, Japan

[21] Appl. No.: 175,265

[22] Filed: Mar. 30, 1988

[30] Foreign Application Priority Data

Mar. 30, 1987 [JP] Japan ................................. 62-77859
Feb. 8, 1988 [JP] Japan ................................. 63-27004

[51] Int. Cl.$^5$ ............................................. G11B 23/00
[52] U.S. Cl. ..................................... 428/694; 427/131; 427/132; 428/611; 428/678; 428/900
[58] Field of Search ............... 428/694, 900, 611, 678, 428/131, 132

[56] References Cited

U.S. PATENT DOCUMENTS

| | | | |
|---|---|---|---|
| 4,707,756 | 11/1987 | Futamoto et al. | 428/694 |
| 4,745,005 | 5/1988 | Sugita et al. | 428/694 |
| 4,745,031 | 5/1988 | Nakayama et al. | 428/694 |
| 4,780,354 | 10/1988 | Nakayama et al. | 428/694 |
| 4,816,351 | 3/1989 | Takagi et al. | 428/694 |

FOREIGN PATENT DOCUMENTS 59-140629 of 1934 Japan.

*Primary Examiner*—Paul J. Thibodeau
*Attorney, Agent, or Firm*—Antonelli, Terry, Stout & Kraus

[57] ABSTRACT

There is disclosed a magnetic recording medium comprising a non-magnetic substrate and a magnetic membrane composed of Co and oxygen formed thereon, which is characterized in that the saturated magnetic flux density of said magnetic layer is in the range of 8,400 G to 12,600 G, the oxygen content of said layer is in the range of 11 to 29 at %, and the residual magnetization in the in-plane direction of the membrane surface, $Mr_{//}$, and the residual magnetization in the perpendicular direction to the membrane surface $Mr\perp$, have a relation satisfying $Mr_{//}/Mr\perp > 1$ and the C-axis of Co of the magnetic membrane is oriented in a perpendicular direction to the membrane surface.

7 Claims, 3 Drawing Sheets

MAGNETIC RECORDING MEDIUM

FIELD OF THE INVENTION AND RELATED ART STATEMENT

1. Field of the Invention

The present invention relates to a magnetic recording medium obtained by coating a magnetic layer composed mainly of Co on a non-magnetic substrate having a predetermined shape. More specifically, the present invention relates to a magnetic recording medium having a Co-O system magnetic membrane capable of obtaining a high regeneration output in both regions of a low density recording region and a high density recording region.

2. Related Art

One of perpendicular magnetic recording media other than Co alloy system is a Co-O system magnetic membrane in which Co is vapour deposited or sputtered.

Though a substrate temperature of 150° C. or more is required to obtain a perpendicular magnetization membrane in the case of a Co alloy membrane, the Co-O system magnetic membrane can be formed into a perpendicular magnetization membrane even that the substrate temperature is room temperature (Ohta et al, Proceedings of the 7th Applied Magnetic Society, published on November, 1983, pages 9 to 13).

Accordingly, a PET film, which is nowadays widely used for magnetic tape and the like, can be used as the base film, resulting in great decrease of cost.

This Co-O system magnetic membrane has a relation of $Mr_1/M_{//} \geq 1$ in the region where the saturated magnetic flux density is smaller than about 7,000 G and becomes perpendicular magnetization in this region (Ohta et al, Proceedings of the 7th Applied Magnetic Society, published on November, 1983, pages 9 to 13), so an invention characterized by making the saturated magnetic flux density 3,000 G to 6,500 G had been applied for a patent {Japanese Patent Application Kokai (Laid-Open) No. 59-140,629}.

However, the Co-O system magnetic membrane having a saturated magnetic flux density of 7,000 G or less and a relation of $Mr1/M_{//} \leq 1$ is disadvantageous in the recording-regenerating properties that only such a low output as $-10$ dB or less can be obtained in both regions of a low density recording and a high density recording as compared with a Co-Cr membrane having a saturated magnetic flux density in the same level (Sugita et al, Reports of Electronic Communication Technique, published on June, 1986, MR86-11 to 16, page 1).

OBJECT AND SUMMARY OF THE INVENTION

Thus, an object of the present invention is to provide a magnetic recording medium having a Co-O system magnetic membrane by which a high regeneration output in both regions of a low density recording and a high density recording.

The present inventors have continued extensive experiments and researches for a long period of years and, as a result, have found that a magnetic recording medium in which a magnetic membrane composed of Co and oxygen is formed on a non-magnetic substrate becomes Co-O system magnetic membrane capable of obtaining a high regeneration output in both regions of a low density recording and a high density recording when the saturated magnetic flux density of said magnetic layer is in the range of 8,400 G to 12,600 G and the oxygen content in said magnetic layer is in the range of 11 to 29 at % and the residual magnetization in the in-plane direction of the membrane, $Mr_{//}$, and the residual magnetization in the perpendicular direction to the membrane surface, Mr1, satisfy a relation of $Mr_{//}/Mr1^\circ 1$ and the C-axis of Co in the magnetic membrane is oriented in an perpendicular direction to the membrane surface. The present invention has been accomplished based on this knowledge.

DETAILED DESCRIPTION OF PREFERRED EMBODIMENTS

The preferred oxygen content in the magnetic layer is 11 to 24 at %.

The rectangular ratio after correction of demagnetizing field so as to adjust the incline of the hysteresis loop in the coercive force in the perpendicular direction to 90° is preferably 0.88 to 1.00.

Furthermore, the surface of the non-magnetic substrate to be formed with magnetic membrane thereon may be treated with plasma, or a primary coat composed of Ti or Ge may be interposed between the surface of the non-magnetic substrate and the magnetic membrane.

Figure 5A:
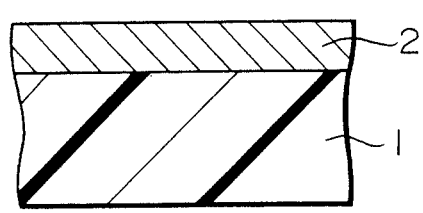
Figure 5B:
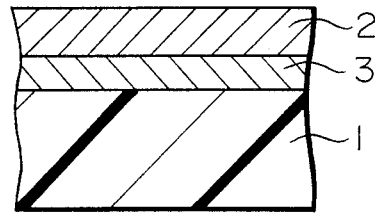

Sectional structures of the magnetic recording media of the present invention are shown in FIGS. 5(a) and 5(b), respectively. In the drawings, on a base film 1 is superposed a Co-O system magnetic membrane 2, and a primary coat 3 is interposed between them. The magnetic recording medium of the present invention is almost same in structure as a conventional magnetic recording medium having a Co-O system magnetic membrane, but the characteristic values such as saturated magnetic flux density, oxygen content and others are different.

As respect to the Co-O system magnetic membrane, a magnetic membrane having a predetermined saturated magnetic flux density is prepared by changing the amount of oxygen introduced in membrane formation. The larger the amount of oxygen introduced is, that is, the more the oxidation of Co proceeds, the saturated magnetic flux density decreases.

Taking notice of the C-axis orientation of Co in perpendicular direction to the membrane surface, which is considered as one of causes by which a Co alloy system magnetic membrane shows perpendicular magnetic anisotropy, when oxygen is not introduced, an orientation of the C-axis of Co in the perpendicular direction to the membrane surface is not recognized. However, the saturated magnetic flux density is decreased to about 12,600 G by introduction of oxygen, the C-axis of Co begin to orientate in the perpendicular direction to the membrane surface. When the saturated magnetic flux density is reduced to less than 8,400 G by further introducing oxygen, the orientation falls into disorder again. Therefore, it is considered that a Co-O membrane having a saturated magnetic flux density of 7,000 G or below has a greatly decreased perpendicular magnetic anisotropy of the membrane because the disorder of the C-axis orientation of Co proceed.

This phenomenon seems as a cause by which a Co-O system magnetic membrane having a saturated magnetic flux density of 7,000 G or less is largely inferior in recording-regenerating properties to a Co-Cr membrane having the same degree of saturated magnetic flux density as mentioned in the section of Related Arts.

Therefore, it is necessary that the Co-O system magnetic membrane has a saturated magnetic flux density in the region where the C-axis of Co is orientated in the perpendicular direction to the membrane surface, that is, in the range of 8,400 G to 12,600 G. In this saturated magnetic flux density region, the ratio of the residual magnetization in the in-plane direction of the membrane Mr∥, to the residual magnetization in the perpendicular direction, Mr⊥, is more than 1, that is, Mr∥/Mr⊥>1.

As to a conventional Co-O system perpendicular magnetic recording medium, the region satisfying the relation of Mr∥/Mr⊥<1 is noticed and the saturated magnetic flux density and the atomic percent of oxygen are regulated. Particularly, Japanese Patent Application Kokai (Laid-Open) No. 59-140,629 discloses that when the saturated magnetic flux density is in the range of 3,500 G to 6,500 G, rectangular ratio, Mr⊥/Ms, measured in perpendicular direction is larger than the rectangular ratio measured in the in-plane direction which means clearly that the perpendicular magnetization film is realized. The oxygen content in the Co-O system magnetic membrane in this region of saturated magnetization is 30 to 40 at %. In this range of oxygen content, the probability on that the C-axis of needle crystal granules of Co are orientated in perpendicular direction to the substrate surface is lowered. In aspect of rectangular ratio, though it might be a perpendicular magnetization film, the rectangular property of M-H curve after correction of demagnetizing field is inferior so that only low regeneration output could be obtained in both regions of low recording density and high recording density.

In fact, though the conventional magnetic recording medium has a residual magnetization in the relation of Mr⊥/Mr∥>1 and a superior anisotropy in perpendicular direction, the magnetization curve thereof when it is corrected by demagnetization field to adjust the incline of hysteresis loop in the perpendicular coersive force in direction to 90° has a poor rectangular ratio such as up to about 0.8. In contrast with this, in the region of Mr∥/Mr⊥>1, the magnetization curve after correction of demagnetization field is superior in rectangular property and has a rectangular ratio of 0.88 to 1.00. Accordingly, a high regeneration output can be expected in a high density recording region where the demagnetizing field reduces.

When the Co-O system magnetic membrane is prepared, a Co-O magnetic membrane is formed after the surface of a polymer film was treated with oxygen plasma or a polymer film was provided with a Ti primary coat or a Ge primary coat, whereby the improvement in making C-axis orientation of Co perpendicular to the film can be expected. Thus, it is considered that these media are suitable in a high density recording region because these have a larger rectangular ratio after correction of demagnetizing field as compared with a Co-O magnetic membrane not treated with plasma or not having a primary coat.

The saturated magnetic flux density of the Co-O magnetic membrane can be easily controlled by regulating the amount of oxygen introduced.

The present invention is illustrated in more detail below by the following Examples with reference to accompanying drawings. However, the scope of the present invention is not limited to the Examples.

EXAMPLE 1

By using an electron gun heating type vacuum deposition apparatus, Co was deposited on a base film made of polyethylene terephthalate (PET) having a thickness of 50 μm. Co or Co-O membranes different in oxygen content were prepared under constant conditions of a substrate temperature of 25° C. kept by cooling with water and a deposition rate of 30 Å/sec and by changing the partial pressure of oxygen in the range of from 0 to 1 Torr.

Figure 1:
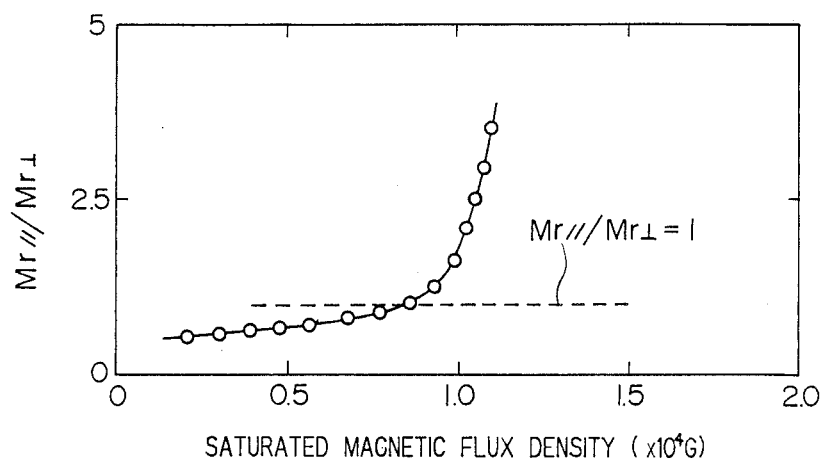
FIG. 1 is a graphical representation showing the relation of the saturated magnetic flux density of a magnetic recording medium of the present invention obtained in Example 1 to the value of $Mr_{//}/Mr1$.

The relation between Mr∥/Mr⊥ of the obtained Co-O membranes and saturated magnetic flux density of 4 πMs is shown in FIG. 1.

The relation of Mr∥/Mr⊥>1 is satisfied in the range of a saturated magnetic flux densities of from 8,400 G to 12,600 G. It was confirmed as a result of electron diffraction that the C-axis of Co was oriented in perpendicular direction to the membrane surface in this region.

Figure 2A:
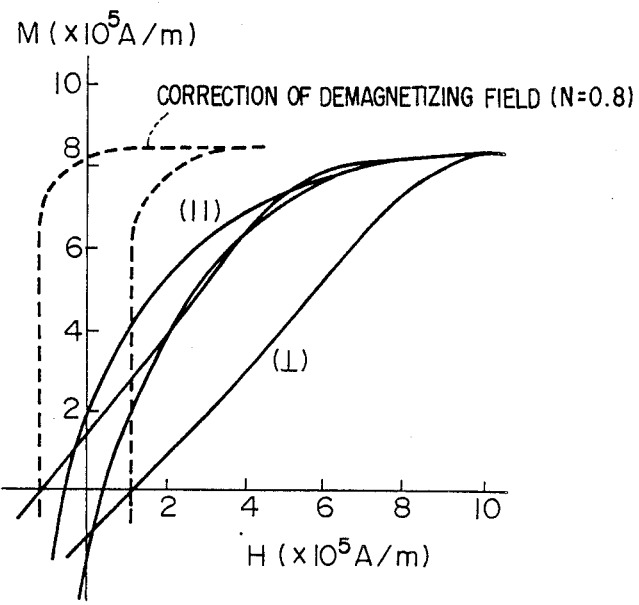
FIG. 2(a) shows magnetization characteristic curves of one example of the magnetic recording medium of the present invention obtained in Example 1.
Figure 2B:
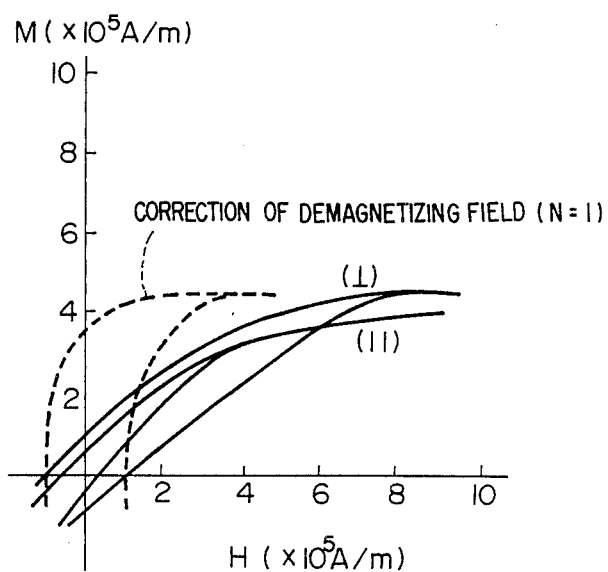
FIG. 2(b) shows magnetization characteristic curves of a magnetic recording medium of Reference Example.

Characteristics of the magnetic recording medium of the present invention obtained as above and a magnetic recording medium of Reference Example are summarized in the following Table 1. FIG. 2 shows each magnetization curve.

TABLE 1

|  | Present invention | Reference Example |
|---|---|---|
| Hc⊥(×10³ A/m) | 120 | 100 |
| Hc∥ (×10³ A/m) | 40 | 50 |
| Mr∥/Mr⊥ | 2.11 | 0.70 |
| 4 πMs (G) | 10300 | 5600 |
| Oxygen content (at %) | 18.5 | 33.0 |
| Mr⊥/Ms after correction of demagnetizing field | 0.96 | 0.76 |

The Co-O magnetic membrane of the present invention have a relation of Mr∥/Mr⊥>1 and a saturated magnetic flux density, 4 πMs, of 10,300 G. The rectangular ratio is found as 0.96 when the demagnetizing factor N, is taken as 0.8 and the incline of hysteresis loop at Hc is taken as 90°. The membrane seems to be a perpendicular magnetization film extremely excellent in rectangular property if there is no demagnetizing field.

On the other hand, the membrane of Reference Example has a relation of Mr⊥>Mr∥, but the rectangular ratio of Mr⊥/Ms is found as 0.76 even when the maximum correction of demagnetizing field, N=1.0 is taken.

Thus, the membrane of Reference Example is inferior in rectangular property to the membrane of the present invention.

EXAMPLE 2

The same procedures as in Example 1 were repeated, except that previous to the formation of a Co-O magnetic membrane, a primary coat composed of the following each metal was formed on the surface of the PET film by a vacuum deposition method.

| Metal used for formation of primary coat | Deposition rate (Å/sec) |
| --- | --- |
| Ti | 30 |
| Ge | 20 |
| Si | 20 |
| Sc | 30 |
| Re | 30 |

The substrate temperature was 25° C. in each case and the thickness of the primary coat formed was 200 Å in each case.

After formation of each primary coat, a Co-O magnetic membrane was formed on the above-mentioned primary coat in the same operation as in Example 1. In order to confirm the effect of interposition of the Ti-primary coat, the rectangular ratios, Mr1/Ms, in the region of $Mr_\parallel /Mr1 > 1$ after correction of demagnetization field were determined on the membranes of Example 1 and this Example. The results are shown in FIG. 3.

Figure 3:
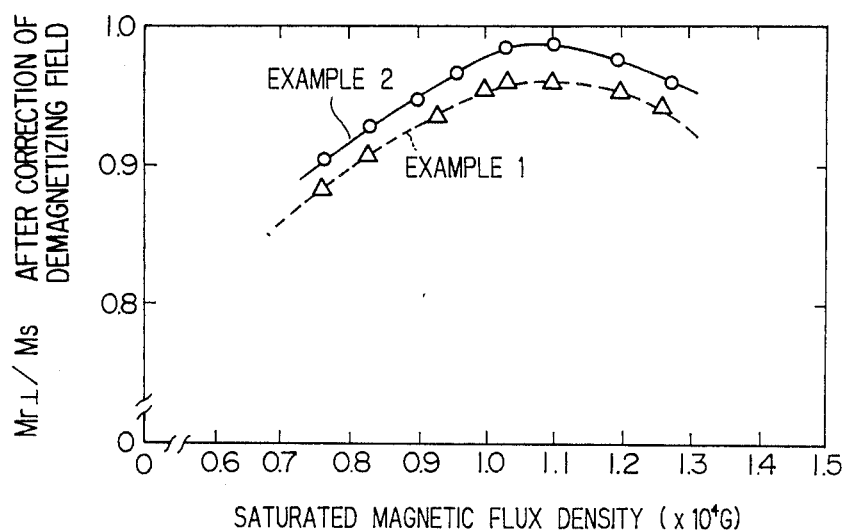
FIG. 3 is a graph showing relations of the value of Mr1/Ms to saturated magnetic flux density of magnetic recording media of Examples 1 and 2 of the present invention, the medium of Example 2 having a Ti-primary coating.

As is clear from FIG. 3, for example, in the same saturated magnetic flux density of 10,300 G, the rectangular ratio of the magnetic recording medium obtained in this Example is 0.98, which is higher than the rectangular ratio of the magnetic recording medium of the present invention in Example 1 of 0.96.

Besides the Ti-primary coat, also in the case of Ge-, Si-, Sc- or Re-primary coat, the same effect could be obtained such that the rectangular ratio became 0.98 or higher.

From these results, the interposition of a primary coat seems to improve the rectangular ratio.

The magnetic recording media of the present invention obtained in Examples 1 and 2 and the magnetic recording medium of Reference Example in Example 1 were subjected to the measurement of recording-regenerating properties. The gap length, the track width, the number of turns of coil, the gap depth of a recording and regenerating head were 0.2 μm, 50 μm, 20 turns and 10 μm, respectively. The results of the measurement are shown in FIG. 4.

Figure 4:
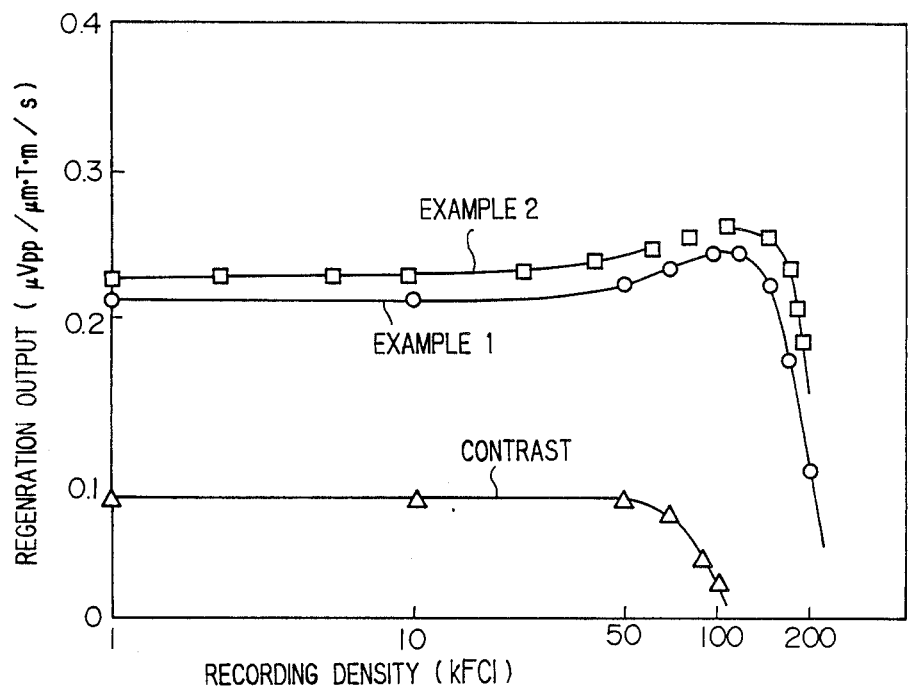
FIG. 4 is a graph shows recording-regenerating characteristic values of magnetic media of Examples 1 and 2 together with that of Reference Example obtained in Example 1 and FIGS. 5(a) and 5(b) show sectional structures of the magnetic recording media of the present invention.

As is clear from FIG. 4, as to the magnetic recording medium of the present invention, a high regeneration output could be obtained in the region of from a low density recording to a high density recording and the value of $D_{50}$ was about 200 kFCI, while as to the magnetic recording medium of Reference Example, in both regions of a low density recording and a high density recording, only about half regeneration output of the present medium could be obtained and the value of $D_{50}$ was 100 kFCI or less.

Also, as is clear from the results shown in FIG. 4, the magnetic recording medium having a primary coat in Example 2 has high recording-regenerating properties in every region of density recording as compared with the magnetic recording medium not having a primary coat of Example 1 or the magnetic recording medium of Reference Example. Though the precise mechanism has not been elucidated yet, it is considered that in the region of $Mr_\parallel /Mr1 > 1$, the orientation of the C-axis of Co in perpendicular direction to the membrane surface is improved and the rectangular ratio of Mr1/Ms after correction of demagnetization field increases in comparison with the medium not having a primary coat, so that the regeneration output was improved.

As is shown in FIG. 4, when the recording density exceeds 200 kFCI, the regeneration output decreases suddenly mainly due to gap loss and spacing loss. Therefore, the magnetic recording medium of the present invention is preferably used in a recording density of 200 kFCI or below.

As is illustrated above, the Co-O magnetic membrane of the present invention has a saturated magnetic flux density in the range of 8,400 G to 12,600 G and an oxygen content in said magnetic layer in the range of 11 to 29 at %$ and a residual magnetization in the in-plane direction of membrane, $Mr_\parallel$, and the residual magnetization in the perpendicular direction of membrane surface, Mr1, satisfy a relation of $Mr_\parallel /Mr1 > 1$. Therefore, the magnetic recording medium of the present invention has a Co-O membrane having a rectangular ratio, Mr1/Ms after correction of demagnetizing field of a high value in the range of 0.88 to 1.00 due to the improvement in the orientation of the C-axis of Co in the perpendicular direction to the membrane surface and hence, by the magnetic recording medium of the present invention, there can be obtained a high regeneration output from a low density recording region to a high density recording region.

Furthermore, the magnetic recording medium of the present invention treated with oxygen plasma previous to the formation of the Co-O magnetic membrane or interposed of a primary coat composed of Ti, Ge or the like has more increased rectangular ratio, Mr1/Ms, after correction of demagnetizing field in a region of $Mr_\parallel /Mr1 > 1$ than the untreated one or one having no primary coat so that the treatment and the interposition are more effective for improving the regeneration output in a low density recording region and a high density recording region.

What is claimed is:

1. A magnetic recording medium comprising a non-magnetic substrate and a magnetic membrane composed of Co and oxygen formed thereon thereby providing a membrane surface, which is characterized in that the saturated magnetic flux density of said magnetic membrane is in the range of 8,400 G to 12,600 G, the oxygen content of said membrane is in the range of 11 to 29 at %, and the residual magnetization in the in-plane direction of the membrane, $Mr_\parallel$, and the residual magnetization in the perpendicular direction to the membrane surface, Mr1, have a relation satisfying $Mr_\parallel /Mr1 > 1$ and the C-axis or Co being oriented in a perpendicular direction of the membrane surface.

2. A magnetic recording medium according to claim 1, wherein the oxygen content in said magnetic membrane is 11 to 24 at %.

3. A magnetic recording medium according to claim 1 or 2, wherein the rectangular ratio after correction of demagnetization field to adjust the incline of the hysteresis loop in the coercive force in the perpendicular direction to 90°, is 0.88 to 1.00

4. A magnetic recording medium according to claim 1 or 2, wherein the surface of said non-magnetic substrate on which said magnetic membrane is formed is treated with plasma or a primary coat comprised of at least one element selected from the group consisting of Ti, Ge, Si, Sc and Re is interposed between said non-magnetic substrate and said magnetic membrane.

5. A magnetic recording medium according to claim 1, wherein the non-magnetic substrate is a polymer film.

6. A magnetic recording medium according to claim 1, wherein the magnetic membrane is formed by deposition of Co on a substrate of polyethylene terephthalate.

7. A magnetic recording medium according to claim 1, wherein a primary coat of a metal selected from the group consisting of Ti, Ge. Si, Sc and Re is interposed between the magnetic membrane and the substrate.

* * * * *

UNITED STATES PATENT AND TRADEMARK OFFICE
CERTIFICATE OF CORRECTION

PATENT NO. : 4,987,039

DATED : January 22, 1991

INVENTOR(S) : H. DAIMON, et al

Page 1 of 2

It is certified that error appears in the above-identified patent and that said Letters Patent is hereby corrected as shown below:

On the Title Page, right-hand column, under the heading "[57] ABSTRACT"
    line 9, "Mr ," should read --$Mr_{\parallel}$--;
    line 10, "Mr /" should read --$Mr_{\parallel}$/--.

Column 1, line 33, "Mr1" should read --$Mr\perp$--;
    line 44, "$Mr1/M_{\parallel} \leq 1$" should read --$Mr\perp/M_{\parallel} \geq 1$--.

Column 2, line 3, "$Mr/_{\iota}$," should read --$Mr_{\parallel}$,--;
    line 5, "Mr1" should read --$Mr\perp$--;
    line 6, "$Mr_{\parallel}/Mr1<1$" should read --$Mr_{\parallel}/Mr\perp>1$--;
    line 15, "/Mr1" should read ----/$Mr\perp$--;
    line 21, "Mr1/Ms" should read --$Mr\perp/Ms$--.

Column 3, line 30, "Mr1" should read --$Mr\perp$--;
    line 31, "Mr1" should read --$Mr\perp$--;
    line 33, "/Mr1" should read --/$Mr\perp$--;
    line 38, "Mr1/Ms" should read --$Mr\perp/Ms$--;
    line 56, "Mr1" should read --$Mr\perp$--;
    line 62, "Mr1" should read --$Mr\perp$--.

Column 4, line 31, "Mr1" should read --$Mr\perp$--;
    line 34, "Mr1" should read --$Mr\perp$--;
    line 57, "Mr1" should read --$Mr\perp$--;
    line 66, "Mr1" should read --$Mr\perp$--;
    line 67, "Mr1" should read --$Mr\perp$--.

Column 5, line 27, "Mr1" should read --$Mr\perp$--;
    line 28, "Mr1" should read --$Mr\perp$--.

UNITED STATES PATENT AND TRADEMARK OFFICE
CERTIFICATE OF CORRECTION

PATENT NO. : 4,987,039

DATED : January 22, 1991

INVENTOR(S) : H. DAIMON, et al

It is certified that error appears in the above-identified patent and that said Letters Patent is hereby corrected as shown below:

Column 6, line 3, "Mr1" should read --$Mr_\perp$--;
line 5, "Mr1" should read --$Mr_\perp$--;
line 20, "Mr ," should read --$Mr_{//}$,--;
line 22, "Mr1" should read --$Mr_\perp$--; same line, "Mr /Mr1>1" should read --$Mr_{//}/Mr_\perp>1$--;
line 25, "Mr1" should read --$Mr_\perp$--;
line 37, "Mr1" should read --$Mr_\perp$--;
line 39, "Mr /Mr1" should read --$Mr_{//}/Mr_\perp$--;
line 55, "Mr1" should read --$Mr_\perp$--; same line, "Mr1" should read --$Mr_\perp$--;
line 56, "or" should read --of--.

Signed and Sealed this

Twenty-second Day of September, 1992

Attest:

DOUGLAS B. COMER

*Attesting Officer*       *Acting Commissioner of Patents and Trademarks*

UNITED STATES PATENT AND TRADEMARK OFFICE
CERTIFICATE OF CORRECTION

PATENT NO. : 4,987,039
DATED : January 22, 1991
INVENTOR(S) : DAIMON, et al

It is certified that error appears in the above-identified patent and that said Letters Patent is hereby corrected as shown below:

On the Title Page, left-hand column

"[73] Assignee:   Hitachi, Ltd., Tokyo, Japan"

should read

"[73] Assignees:   Hitachi, Ltd., Tokyo, Japan and

Hitachi Maxell, Ltd., Osaka, Japan"

Signed and Sealed this

Twenty-fourth Day of November, 1992

Attest:

DOUGLAS B. COMER

Attesting Officer           Acting Commissioner of Patents and Trademarks